United States Patent
Gee et al.

(10) Patent No.: US 11,408,161 B2
(45) Date of Patent: Aug. 9, 2022

(54) VACUUM-ASSISTED TOILET SYSTEMS AND METHODS OF USING THE SAME

(71) Applicant: BRIGHAM YOUNG UNIVERSITY, Provo, UT (US)

(72) Inventors: Kent L. Gee, Provo, UT (US); Scott D. Sommerfeldt, Provo, UT (US); Scott L. Thomson, Provo, UT (US)

(73) Assignee: BRIGHAM YOUNG UNIVERSITY, Provo, UT (US)

( * ) Notice: Subject to any disclaimer, the term of this patent is extended or adjusted under 35 U.S.C. 154(b) by 0 days.

(21) Appl. No.: 16/967,521

(22) PCT Filed: Mar. 21, 2019

(86) PCT No.: PCT/US2019/023410
§ 371 (c)(1),
(2) Date: Aug. 5, 2020

(87) PCT Pub. No.: WO2020/190300
PCT Pub. Date: Sep. 24, 2020

(65) Prior Publication Data
US 2021/0404160 A1 Dec. 30, 2021

(51) Int. Cl.
*E03D 5/01* (2006.01)
*E03D 5/012* (2006.01)
(Continued)

(52) U.S. Cl.
CPC .............. *E03D 5/012* (2013.01); *B64D 11/02* (2013.01); *E03D 5/10* (2013.01); *E03D 9/14* (2013.01);
(Continued)

(58) Field of Classification Search
CPC .. E03D 5/012; E03D 9/14; E03D 5/10; E03D 11/00
See application file for complete search history.

(56) References Cited

U.S. PATENT DOCUMENTS

| | | | |
|---|---|---|---|
| 434,116 A | 8/1890 | Ricketts | |
| 2,075,030 A | 3/1937 | Dunean | |

(Continued)

FOREIGN PATENT DOCUMENTS

| | | |
|---|---|---|
| CN | 1111704 A | 11/1995 |
| CN | 1115961 A | 1/1996 |

(Continued)

OTHER PUBLICATIONS

U.S. Appl. No. 16/967,806, filed Aug. 6, 2020.
(Continued)

*Primary Examiner* — Lauren A Crane
(74) *Attorney, Agent, or Firm* — Dorsey & Whitney LLP

(57) ABSTRACT

An example vacuum-assisted toilet includes a toilet bowl including an outlet. The outlet of the toilet bowl is fluidly coupled to a first flush valve, for example, using a first pipe. The first flush valve is fluidly coupled to a second flush valve that is positioned downstream from the first flush valve. For example, the first flush valve may be fluidly coupled to the second flush valve using a second pipe. The second flush valve is fluidly coupled to a vacuum source. The vacuum source may include, for example, a holding tank having a vacuum pressure therein, a vacuum pump, or any other suitable vacuum source.

20 Claims, 5 Drawing Sheets

(51) Int. Cl.
*E03D 5/10* (2006.01)
*E03D 9/14* (2006.01)
*E03F 1/00* (2006.01)
*B64D 11/02* (2006.01)
*E03D 11/10* (2006.01)

(52) U.S. Cl.
CPC .............. *E03D 11/10* (2013.01); *E03F 1/006* (2013.01); *E03D 2201/20* (2013.01)

(56) References Cited

U.S. PATENT DOCUMENTS

| | | |
|---|---|---|
| 3,995,328 A | 12/1976 | Carolan et al. |
| 4,989,277 A | 2/1991 | Tsutsui et al. |
| 5,007,117 A * | 4/1991 | Oldfelt .................... E03F 1/006 4/432 |
| 5,317,763 A | 6/1994 | Frank et al. |
| 5,604,938 A | 2/1997 | Tyler |
| 6,085,366 A | 7/2000 | Pondelick et al. |
| 6,385,789 B1 | 5/2002 | Pondelick et al. |
| 6,668,391 B1 | 12/2003 | Lee et al. |
| 6,910,231 B2 | 6/2005 | Breiing et al. |
| 7,207,073 B1 | 4/2007 | Blankenburg |
| 8,370,969 B2 | 2/2013 | Bowcutt et al. |
| 10,683,652 B1 | 6/2020 | Beach et al. |
| 2003/0229939 A1* | 12/2003 | Berman .................. E03F 1/006 4/434 |
| 2006/0137085 A1 | 6/2006 | Xiang et al. |
| 2006/0225200 A1 | 10/2006 | Wierenga |
| 2008/0060121 A1 | 3/2008 | Andreiu |
| 2008/0185477 A1 | 8/2008 | Seibt |
| 2008/0237397 A1 | 10/2008 | Seibt |
| 2009/0199332 A1 | 8/2009 | Mesun et al. |
| 2010/0313344 A1 | 12/2010 | Ina et al. |
| 2012/0066826 A1 | 3/2012 | Molina |
| 2013/0099477 A1 | 4/2013 | Horiguchi |
| 2013/0305444 A1* | 11/2013 | Boodaghians ............ E03D 9/05 4/323 |
| 2015/0059075 A1 | 3/2015 | Oxenfarth et al. |
| 2016/0376779 A1 | 12/2016 | Boeltl et al. |
| 2017/0009438 A1* | 1/2017 | Stachowski ............ B64D 11/02 |
| 2017/0030063 A1 | 2/2017 | Godines |
| 2017/0121955 A1 | 5/2017 | Hall et al. |
| 2017/0152657 A1 | 6/2017 | Seimiya |
| 2017/0247871 A1 | 8/2017 | Mukerji et al. |
| 2018/0355598 A1 | 12/2018 | Villalobos Lopez |
| 2019/0257065 A1 | 8/2019 | Schibur et al. |
| 2020/0018055 A1 | 1/2020 | Garrels et al. |
| 2020/0378103 A1 | 12/2020 | Nakagawa et al. |
| 2021/0317649 A1 | 10/2021 | Helmstetter et al. |

FOREIGN PATENT DOCUMENTS

| | | |
|---|---|---|
| CN | 104334452 A | 2/2015 |
| CN | 106436864 A | 2/2017 |
| DE | 102015214636 A1 | 2/2017 |
| EP | 0679211 B1 | 8/1996 |
| EP | 2365144 A1 | 9/2011 |
| EP | 2365144 A9 | 7/2012 |
| GB | 1063711 A | 3/1967 |
| WO | 2020190302 A1 | 9/2020 |

OTHER PUBLICATIONS

U.S. Appl. No. 16/968,259, filed Aug. 7, 2020.
International Search Report and Written Opinion from International Application No. PCT/US2018/023414 dated May 24, 2019.
International Search Report and Written Opinion from International Application No. PCT/US2019/023410 dated Jun. 11, 2019.
International Search Report and Written Opinion from International Application No. PCT/US2019/023412 dated Jun. 11, 2019.
U.S. Appl. No. 62/647,479, filed Mar. 23, 2018.
Non-Final Office Action for U.S. Appl. No. 16/967,806 dated Dec. 6, 2021.
Notice of Allowance for U.S. Appl. No. 16/968,259 dated Feb. 16, 2022.
Rose, et al., "Noise Reduction of a Vacuum-Assisted Toilet", Impact of Noise Control Engineering: 47th International Congress and Exposition on Noise Control Engineering, Aug. 2018, pp. 1314-1323.

* cited by examiner

VACUUM-ASSISTED TOILET SYSTEMS AND METHODS OF USING THE SAME

BACKGROUND

Vacuum-assisted toilets are commonly used in airplanes, cruise ships, and other locations where water is scarce since vacuum-assisted toilets may operate using less water than other types of toilets. Vacuum-assisted toilets are also starting to be used in locations that do not have the water restrictions of airplanes, cruise ships, etc., such as in residential applications, to conserve water.

Generally, a vacuum-assisted toilet system includes a toilet bowl, a single flush valve disposed downstream from the toilet bowl, and a vacuum source fluidly coupled to the single flush valve. During operation, a large pressure differential exists across the single flush valve when the single flush valve is in a closed state (e.g., restricts fluid flow through the single flush valve). For example, the upstream side of the single flush valve is exposed to a pressure that is similar to the pressure in the toilet bowl (e.g., a pressure that is equal to or greater than room pressure) and the downstream side of the single flush valve is exposed to a vacuum (i.e., a pressure that is significantly less than room pressure). Switching the single flush valve from the closed state to an open state (e.g., allows fluid flow through the single flush valve) and generally leads to turbulent flow of any waste flowing through the single flush valve due to the pressure differential between the two sides of the single flush valve. As used herein, waste refers to water, urine, stool, toilet paper, air, or any other item that is disposed in the toilet bowl. The waste may continue to exhibit turbulent flow through the single flush valve after the single flush valve is in the open state. The turbulent flow of the waste through the single flush valve creates a loud noise.

SUMMARY

In an embodiment, a vacuum-assisted toilet system is disclosed. The vacuum-assisted toilet system includes a toilet bowl including an outlet. The vacuum-assisted toilet system also includes a first flush valve fluidly coupled to the outlet of the toilet bowl. The first flush valve is configured to controllably switch between a first open state and a first closed state. The vacuum-assisted toilet system further includes a second flush valve fluidly coupled to the first flush valve at a location downstream from the first flush valve. The second flush valve is configured to controllably switch between a second open state and a second closed state. Additionally, the vacuum-assisted toilet system includes a vacuum source fluidly coupled to the second flush valve at a location downstream from the second flush valve. The first flush valve is configured to controllably switch from the first closed state to the first open state at a first time and the second flush valve is configured to controllably switch from the second closed state to the second open state at a second time that is after the first time.

In an embodiment, a method of operating a vacuum-assisted toilet system is disclosed. The method includes manipulating a flushing actuator. The method also includes, responsive to manipulating the flushing actuator, controllably switching a first flush valve from a first closed state to a first open state at a first time, the first flush valve fluidly coupled to an outlet of a toilet bowl. The method further includes, responsive to controllably switching the first flush valve from the first closed state to the first open state, removing at least some waste from the toilet bowl to a location downstream from the first flush valve. Additionally, the method includes, responsive to manipulating the flushing actuator, controllably switching a second flush valve from a second closed state to a second open state at a second time that is after the first time. The second flush valve is coupled to and located downstream from the first flush valve. The method also includes, responsive to controllably switching the second flush valve from the second closed state to the second open state, subjecting the waste from the toilet bowl to a vacuum from a vacuum source and removing substantially all of the waste to a location downstream from the second flush valve.

In an embodiment, a vacuum-assisted toilet system is disclosed. The vacuum-assisted toilet system includes a toilet bowl including an outlet, a first flush valve configured to controllably switch between a first open state and a first closed state, a first pipe extending between and fluidly coupling the outlet of the toilet bowl to the first flush valve, a second flush valve configured to controllably switch between a second open state and a second closed state, a second pipe extending between and fluidly coupling the first flush valve to the second flush valve, at least one holding tank configured to receive waste from the toilet bowl, a third pipe extending between and fluidly coupling the second flush valve to the at least one holding tank, and a vacuum source fluidly coupled to the second flush valve at a location downstream from the second flush valve. The first flush valve is configured to controllably switch from the first closed state to the first open state at a first time and the second flush valve is configured to controllably switch from the second closed state to the second open state at a second time that is after the first time.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present disclosure, wherein identical reference numerals refer to identical or similar elements or features in different views or embodiments shown in the drawings.

DETAILED DESCRIPTION

Figure 1:
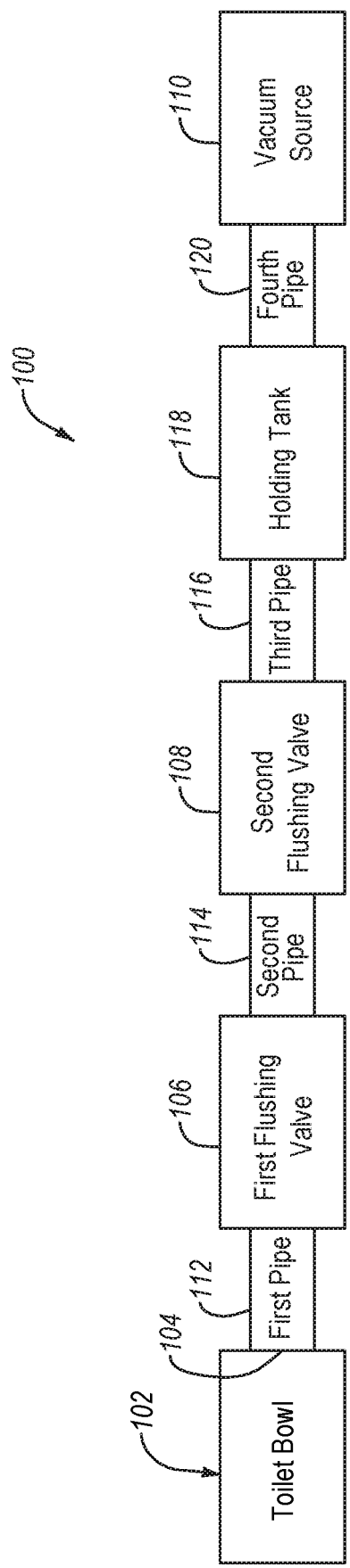
FIG. 1 is a schematic illustration of a vacuum-assisted toilet bowl system, according to an embodiment.

Embodiments disclosed herein are directed towards vacuum-assisted toilet systems and methods of using the vacuum-assisted toilets. An example vacuum-assisted toilet system includes a toilet bowl including an outlet. The outlet of the toilet bowl is fluidly coupled to a first flush valve, for example, using a first pipe. The first flush valve is fluidly coupled to a second flush valve that is positioned downstream from the first flush valve. For example, the first flush valve may be fluidly coupled to the second flush valve using a second pipe. The second flush valve is fluidly coupled to a vacuum source. The vacuum source may include, for example, a holding tank having a vacuum pressure therein, a vacuum pump, or any other suitable vacuum source.

The vacuum-assisted toilet systems disclosed herein enable reducing the noise generated during operation at least in part by reducing the pressure differential across any flush valve and/or moving the pressure differential further from the toilet bowl. For example, as previously discussed, the vacuum-assisted toilets disclosed herein include a first flush valve and a second flush valve positioned downstream from the first flush valve. The first and second flush valves may be fluidly coupled together using a pipe. The first flush valve is fluidly coupled to the toilet bowl and, as such, an upstream side of the first flush valve is exposed to substantially the same pressure found in the toilet bowl (e.g., a pressure that is at or greater than room pressure) when the first flush valve is in the first closed state (e.g., the first flush valve restricts waste flow therethrough). The second flush valve is fluidly coupled to a vacuum source that is located downstream from the second flush valve and, as such, a downstream side of the second flush valve is exposed to a vacuum when the second flush valve is in the second closed state (e.g., the second flush valve restrict waste flow therethrough). Meanwhile, the downstream side of the first flush valve and the upstream side of the second flush valve are fluidly coupled together and are exposed to the same pressure. The pressure that the downstream side of the first flush valve and the upstream side of the second flush valve are exposed to when the first and second flush valves are in their respective closed states is greater than the vacuum pressure (e.g., substantially the same as the pressure that the upstream side of the flush valve is exposed). As such, when the first flush valve is in the first closed state, a pressure differential between the upstream and downstream sides of the first flush valve is less than if the downstream side of the first flush valve was exposed to the vacuum.

During operation, at a first time, the first flush valve is switched from a first closed state to a first open state (e.g., the first flush valve allows waste flow therethrough). However, since the downstream side of the first flush valve is not exposed to a vacuum, the waste flowing through the first flush valve is less turbulent and significantly quieter than if the downstream side of the first flush valve was exposed to the vacuum. At a second time that is after the first time, the second flush valve switches from a second closed state (to a second open state (e.g., the second flush valve allows waste flow therethrough).

However, the perceivable noise at and/or near the toilet bowl (e.g., within 1 to 2 meters of a front of the toilet bowl) that is generated by the second flowing through the second flush valve may be less than the noise generated by conventional vacuum-assisted toilet systems. For example, the second flush valve may be positioned further downstream from the outlet of the toilet bowl than the single flush valve of conventional vacuum-assisted toilet bowls. The further distance between the outlet of the toilet bowl and the second flush valve at least partially acoustically insulates the toilet bowl from any noise generated as the fluid flows through the second flush valve. Also, switching the first flush valve to the first open state before switching the second flush valve to the second open state shifts at least some of the waste towards the second flush valve before the second flush valve switches to the open state. Shifting the waste towards the second flush valve moves the pressure differential between a high pressure caused by the waste and the vacuum to be closer to the second flush valve which, in turn, decreases the turbulent flow of waste through the first flush valve and decreases the noise generated by using the vacuum-assisted toilet system.

FIG. 1 is a schematic illustration of a vacuum-assisted toilet bowl system 100, according to an embodiment. The vacuum-assisted toilet bowl system 100 includes a toilet bowl 102 defining an outlet 104. The vacuum-assisted toilet bowl system 100 also includes a first flush valve 106 fluidly coupled to the outlet 104 and a second flush valve 108 that is fluidly coupled to and positioned downstream from the first flush valve 106. The first flush valve 106 is configured to switch from a first closed state to a first open state at a first time and the second flush valve 108 is configured to switch from a second closed state to a second open state at a second time that is after the first time which, as discussed in more detail below, may reduce the noise generated by the vacuum-assisted toilet system 100. Further, in an embodiment, the second flush valve may be configured to switch to the second closed state at a third time that is after the second time and the first flush valve may be configured to switch to the first closed state at a fourth time which, as will be discussed in more detail below, may reduce the noise generated by the vacuum-assisted toilet system 100. The vacuum-assisted toilet bowl system 100 further includes a vacuum source 110 fluidly coupled to and positioned downstream from the second flush valve 108.

The toilet bowl 102 may include any suitable toilet bowl. For example, the toilet bowl 102 generally includes at least one concave portion that is configured to receive human waste (e.g., urine stool, etc.) from an individual. The concave portion may also be configured to receive other types of waste, such as toilet paper, depending on the application of the toilet bowl 102. The toilet bowl may also include a seat that is configured to support an individual. The seat may include at least one hole that allows human waste to enter the concave portion of the toilet bowl 102 while the individual is seated on the seat.

In an embodiment, the vacuum-assisted toilet system 100 may include a first pipe 112 extending between the outlet 104 of the toilet bowl 102 to the first flush valve 106. As such, the first pipe 112 may fluidly couple the toilet bowl 102 to the first flush valve 106. It is noted that the first pipe 112 may hold the waste therein instead of or in conjunction with the toilet bowl 102 before the flush valve 106 switches to its open state.

The first pipe 112 may be formed from a plurality of pieces connected together or may include a single piece. Forming the first pipe 112 from a single piece may limit leaks in the first pipe 112 than if the first pipe 112 was formed from a plurality of pieces. Generally, the first pipe 112 is distinct from the toilet bowl 102. However, at least a portion of the first pipe 112 may be integrally formed with the toilet bowl 102. The first pipe 112 may be integrally formed with the toilet bowl 102, for example, when the vacuum-assisted toilet system 100 is made for residential applications and is at least partially formed from a single piece of porcelain. When the first pipe 112 is integrally formed with the toilet bowl 102, the first pipe 112 is distinguishable from the toilet bowl 102 because a width of the first pipe 112 is substantially constant (e.g., varies by at most 30%) whereas the width of the toilet bowl 102 generally varies. Also, the first pipe 112 is generally distinct from the first flush valve 106. However, at least a portion of the first pipe 112 may be integrally formed with the first flush valve 106. When the first pipe 112 is integrally formed with the first flush valve 106, the first pipe 112 is distinguishable from the first flush valve 106 because at least one of the first flush valve 106 may form a bulge relative to the first pipe 112 or the first pipe 112 terminates at any portion of the first flush valve 106 that may hold a moveable obstruction that adjustably restricts flow through the first flush valve 106.

The first pipe 112 spaces the first flush valve 106 from the toilet bowl 102 to partially acoustically insulate the toilet bowl 102 from the noise generated by the turbulent flow of the waste through the first flush valve 106. The ability of the first pipe 112 to acoustically insulate the toilet bowl 102 from the first flush valve 106 generally depends on the length of the first pipe 112. As used herein, the length of the first pipe 112 refers to the length of a center of a flow path defined by the first pipe 112. In an embodiment, the first pipe 112 exhibits a length of about 7 cm to about 30 cm, such as about 15 cm, due to space restrictions of the vacuum-assisted toilet system 100 near the toilet bowl 102. However, it is noted that the first pipe 112 may exhibit lengths greater than about 30 cm when the first pipe 112 follows an indirect path to the first flush valve 106 (e.g., the first pipe 112 includes one or more bends therein). Examples of pipes that follow an indirect path to the first flush valve 106 are disclosed in application No. PCT/US19/23414 filed on Mar. 21, 2019, the disclosure of which is incorporated herein, in its entirety, by this reference.

In an embodiment, the first pipe 112 is omitted from the vacuum-assisted toilet system 100. In such an embodiment, the first flush valve 106 may be directly connected to the outlet 104 of the toilet bowl 102.

The first flush valve 106 may include any suitable valve. For example, the first flush valve 106 may include a ball valve, a butterfly valve, a solenoid, or any other suitable valve. Depending on the type of valve that forms the first flush valve 106, the first flush valve 106 may include a body forming an inlet port and an outlet port. The first flush valve 106 may also include a moveable obstruction in the body that adjustably restricts fluid flow through the first flush valve 106. The moveable obstruction restricts fluid flow through the first flush valve 106 when the first flush valve 106 is in the first closed state and allows fluid flow through the first flush valve 106 when the first flush valve 106 is in the first open state. When the first flush valve 106 is in the first closed state, the moveable obstruction is the boundary between the upstream side and the downstream side of the first flush valve 106, as discussed above.

The first flush valve 106 also includes (e.g., is integrally formed with or is mechanically coupled to) a valve actuator that is configured to switch the first flush valve 106 between the first open state and the first closed state. For example, activating the valve actuator may move the moveable obstruction of the first flush valve 106 from a position that restricts waste flow through the first flush valve 106 to a position that allows waste flow through the first flush valve 106, and/or vice versa. The valve actuator may include any actuator that may switch the first flush valve 106 between the first closed state and the first open state. For example, the first flush valve 106 may be an electric motor, an electrical energy supply (e.g., when the first flush valve 106 is a solenoid), or any other suitable actuator.

Conventional vacuum-assisted toilet systems generally have a flush valve positioned near or adjacent to the toilet bowl thereof. For example, the flush valve of conventional vacuum-assisted toilet systems may be at least one of attached to the toilet bowl, attached to a structure that supports the toilet bowl, attached to a structure that is attached to the toilet bowl, or positioned within 15 cm of the toilet bowl (e.g., positioned within 15 cm of the outlet of the toilet bowl). In an embodiment, the first flush valve 106 may be positioned near or adjacent to the toilet bowl 102 in the same manner as any of the flush valves of the conventional vacuum-assisted toilet systems discussed above. In such an embodiment, the vacuum-assisted toilet system 100 may be used in locations that are configured to receive the conventional vacuum-assisted toilet systems. For instance, it may be difficult and/or expensive to redesign or modify an existing airplane design to accommodate the vacuum-assisted toilet system 100 if the first flush valve 106 is spaced from the toilet bowl 102. Further, positioning the first flush valve 106 proximate to the toilet bowl 102 may allow the vacuum-assisted toilet system 100 to be formed by retrofitting a conventional vacuum-assisted toilet system to include at least some of the features disclosed herein (e.g., include the second flush valve 108). However, in an embodiment, the vacuum-assisted toilet system 100 may include the first flush valve 106 that is spaced from the toilet bowl 102.

In an embodiment, the vacuum-assisted toilet system 100 includes a second pipe 114 extending between the first and second flush valves 106, 108 that is configured to fluidly couple the first and second flush valves 106, 108 together. Except as otherwise disclosed herein, the second pipe 114 may be the same as or substantially similar to the first pipe 112. For example, the second pipe 114 may be distinct from or integrally formed with at least one of the first flush valve 106 or the second flush valve 108 and formed from a single piece or a plurality of pieces.

The second pipe 114 exhibits a length measured along a center of a flow path defined thereby. The length of the second pipe 114 may be selected to be greater than about 7 cm, such as in ranges of about 7 cm to about 15 cm, about 10 cm to about 20 cm, about 15 cm to about 30 cm, about 25 cm to about 50 cm, or greater than about 50 cm. The length of the second pipe 114 may be selected based on a number of factors. In an example, the length of the second pipe 114 is selected based on the desired noise generated by the turbulent flow of waste through the second flush valve 108. For instance, increasing the length of the second pipe 114 causes the turbulent flow of the waste through the second flush valve 108 to be further spaced from the toilet bowl 102 thereby decreasing the noise detected at and/or near the toilet bowl 102. However, it is worth noting that, at some point, increasing the length of the second pipe 114 beyond a certain length (currently believed to be at or near 60 cm) may only negligibly decrease the noise detected at and/or near the toilet bowl 102 that is caused by the turbulent flow of waste through the second flush valve 108.

In an example, the length of the second pipe 114 is selected based on the position of the second flush valve 108 relative to the first flush valve 106. In an embodiment, the second flush valve 108 may be positioned proximate (e.g., within 30 cm) to the first flush valve 106, such as positioning the second flush valve 108 to be attached to the toilet bowl 102, attached to a structure supporting the toilet bowl 102 or that is supported by the toilet bowl 102, or otherwise positioned proximate to the toilet bowl 102. For example, the vacuum-assisted toilet system 100 may form one or more gaps or unfilled locations, such as one or more gaps or unfilled locations under a housing that hides the components (e.g., the first flush valve 106 and the first pipe 112) from an individual using the vacuum-assisted toilet system 100 and the gaps or unfilled locations may be sufficiently large to have the second flush valve 108 disposed therein. In such an example, the second flush valve 108 may be positioned proximate to the first flush valve 106 and the length of the second pipe 114 may be selected based on the relative proximity between the first and second flush valve 106, 108. However, it is noted that the second pipe 114 may include one or more bends therein such that the length of the second pipe 114 is greater than a distance between the first and second flush valves 106, 108. In an embodiment, the second flush valve 108 may be significantly spaced from (e.g., more than 30 cm) from the first flush valve 108. For example, the vacuum-assisted toilet system 100 may be configured to be used in a location that that does not have sufficient space near the first flush valve 106 to have the second flush valve 108. In such an example, it may be difficult and/or expensive to reconfigure the space that receives at least the first flush valve 106 to also receive the second flush valve 108. As such, instead of being positioned near the first flush valve 106, the second flush valve 108 may be positioned at any location between the first flush valve 106 and the vacuum source 110 that has sufficient space to receive the second flush valve 108. For instance, retrofitting a conventional vacuum-assisted toilet system to form the vacuum-assisted toilet system 100 disclosed herein may at least include attaching the second flush valve 108 along some location of the flow path between the original flush valve and the vacuum source 110. As such, in such an embodiment, the second pipe 114 may have a length that is greater than 30 cm since the space between the first flush valve 106 and the second flush valve 108 is greater than 30 cm.

In an embodiment, the second pipe 114 is omitted from the vacuum-assisted toilet system 100. In such an embodiment, the first and second flush valves 106, 108 may be fluidly coupled together using alternative techniques. In an example, the first and second flush valves 106, 108 may be fluidly coupled together. In such an example, the inherent space between the moveable obstructions of the first and second flush valves 106, 108 may be sufficient to reduce the noise generated by the vacuum-assisted toilet system 100 though the noise reduction may be less than if the first and second flush valves 106, 108 were spaced from each other by the second pipe 114. In an example, the vacuum-assisted toilet system 100 may include a reservoir between the first and second flush valves 106, 108.

The second flush valve 108 may include any of the flush valves disclosed herein. In an embodiment, the first and second flush valves 106, 108 are the same (e.g., the same type of valve) which may facilitate the design and repair of the vacuum-assisted toilet system 100. In an embodiment, the first and second flush valves 106, 108 may be different. In an example, during operation, the pressure differential between the upstream and downstream sides of the first and second flush valves 106, 108 may be different, especially when the first and second flush valves 106, 108 are in their respective closed states. For instance, the upstream and downstream sides of the first flush valve 106 may be at or near room pressure while the upstream side of the second flush valve 108 is at or near room pressure while the downstream side of the second flush valve 108 is exposed to the vacuum. As such, the second flush valve 108 may be formed from a stronger valve (e.g., a valve having thicker walls or formed from a stronger material) than the first flush valve 106. In an example, the first and second flush valves 106, 108 may be different because the first flush valve 106 may be exposed to more fluids than the second flush valve 108 since the first flush valve 106 may be substantially continuously exposed to fluid in the toilet bowl 102. As such, the first flush valve 106 may be formed from a more corrosion and/or oxidative resistive material than the second flush valve 108.

In an embodiment, the vacuum-assisted toilet system 100 is configured to be used on an airplane, a cruise ship, or another location that is not connected to a sewer system, sceptic tank, or other suitable alternatives. In such an embodiment, the vacuum-assisted toilet system 100 may include at least one holding tank 118. The holding tank 118 is fluidly coupled to the second flush valve 108 and defines an interior space that is configured to receive and store the waste that flowed through the second flush valve 108 in an at least substantially fluid tight manner.

In an embodiment, the holding tank 118 may be fluidly connected to the second flush valve 108 via a third pipe 116. In other words, the third pipe 116 may extend between the second flush valve 108 and the holding tank 118. In an embodiment, the third pipe 116 may be omitted from the vacuum-assisted toilet system 100, for example, when the second flush valve 108 is adjacent to or integrally formed with the holding tank 118. The holding tank 118 may also be fluidly connected to the vacuum source 110, for example, via a fourth pipe 120 (e.g., the fourth pipe 120 extends between the holding tank 118 and the vacuum source 110). In an embodiment, the fourth pipe 120 may be omitted from the vacuum-assisted toilet system 100, for example, when the holding tank 118 is adjacent to or integrally formed with the vacuum source 110.

It is noted that the holding tank 118 may be omitted from the vacuum-assisted toilet system 100, for example, when the vacuum-assisted toilet system 100 is configured to be fluidly connected to a sewer system, a septic tank, etc. For example, the holding tank 118 may be omitted from the vacuum-assisted toilet system 100 when the vacuum-assisted toilet system 100 is configured to be used in a residential application since, generally, residential buildings are connected to sewer systems, septic tanks, etc. When the holding tank 118 is omitted from the vacuum-assisted toilet system 100, the third pipe 116 may extend from the second flush valve 108 to the vacuum source 110 or the second flush valve 108 may be positioned adjacent to or integrally formed with the vacuum source 110.

As previously discussed, the vacuum-assisted toilet system 100 includes a vacuum source 110 that is configured to apply a vacuum (e.g., a pressure that is significantly less than room pressure) to one or more components of the vacuum-assisted toilet system 100 depending on whether the first and second flush valves 106, 108 are in their respective open or closed states. In the illustrated embodiment, the vacuum source 110 is configured to apply the vacuum to the holding tank 118 such that an interior space of the holding tank 118 exhibits the vacuum. Causing the interior space of the holding tank 118 to exhibit the vacuum may facilitate pulling the waste into the holding tank 118. The vacuum source 110 may also apply the vacuum to at least the downstream side of the second flush valve 108. When the second flush valve 108 is in the second open state, the vacuum source 110 also applies the vacuum to the second pipe 114 and the downstream side of the first flush valve 106. Further, when the first flush valve 106 is in the first open state, the vacuum source 110 also applies the vacuum to the upstream side of the first flush valve 106, the first pipe 112, and the toilet bowl 102 thereby pulling the waste into the holding tank 118.

It is noted that, when the vacuum-assisted toilet system 100 does not include the holding tank 118, the vacuum source 110 may be positioned between the second flush valve 108 and the sewer system, septic tank, etc. The vacuum source 110 may apply a vacuum to a location between the second flush valve 108 and the sewer system, septic tank, etc. thereby pulling the waste to the location and towards the sewer system, septic tank, etc.

The type of vacuum source 110 that is used in the vacuum-assisted toilet system 100 may depend on the application of the vacuum-assisted toilet system 100. In an embodiment, the vacuum source 110 may be a vacuum pump, for example, when the vacuum source 110 is used in a cruise ship, a residential application, etc. In an embodiment, the vacuum source 110 may be an exterior of an airplane when the vacuum-assisted toilet system 100 is used in an airplane. For example, during flight, an interior of the airplane may exhibit a pressure (e.g., room pressure) of about 0.7 atmospheres to about 1.0 atmospheres while an exterior of the plane exhibits a pressure of about 0.4 atmospheres or less at a cruising altitude of about 35,000 feet. In other words, relative to the pressure of the interior of the airplane, the exterior of the airplane is a vacuum. As such, the exterior of the airplane may be the vacuum source 110 and the fourth pipe 120 may extend from the holding tank 118 to an exterior of the airplane. However, it is noted that, the vacuum source 110 may include a vacuum pump instead of or in conjunction with the exterior of the airplane. In an embodiment, the vacuum source 110 may include a water storage tank that is fluidly coupled to the toilet bowl 102 and configured to empty itself when the toilet bowl 102 is flushed. For example, emptying the water storage tank may, when the water storage tank is substantially fluid tight, creates a vacuum in the water storage tank. The vacuum in the water storage tank may then be used to remove the waste (e.g., including the water that was originally in the water storage tank) from the toilet bowl 102 and through the first and second flush valves 106, 108.

Figure 2:
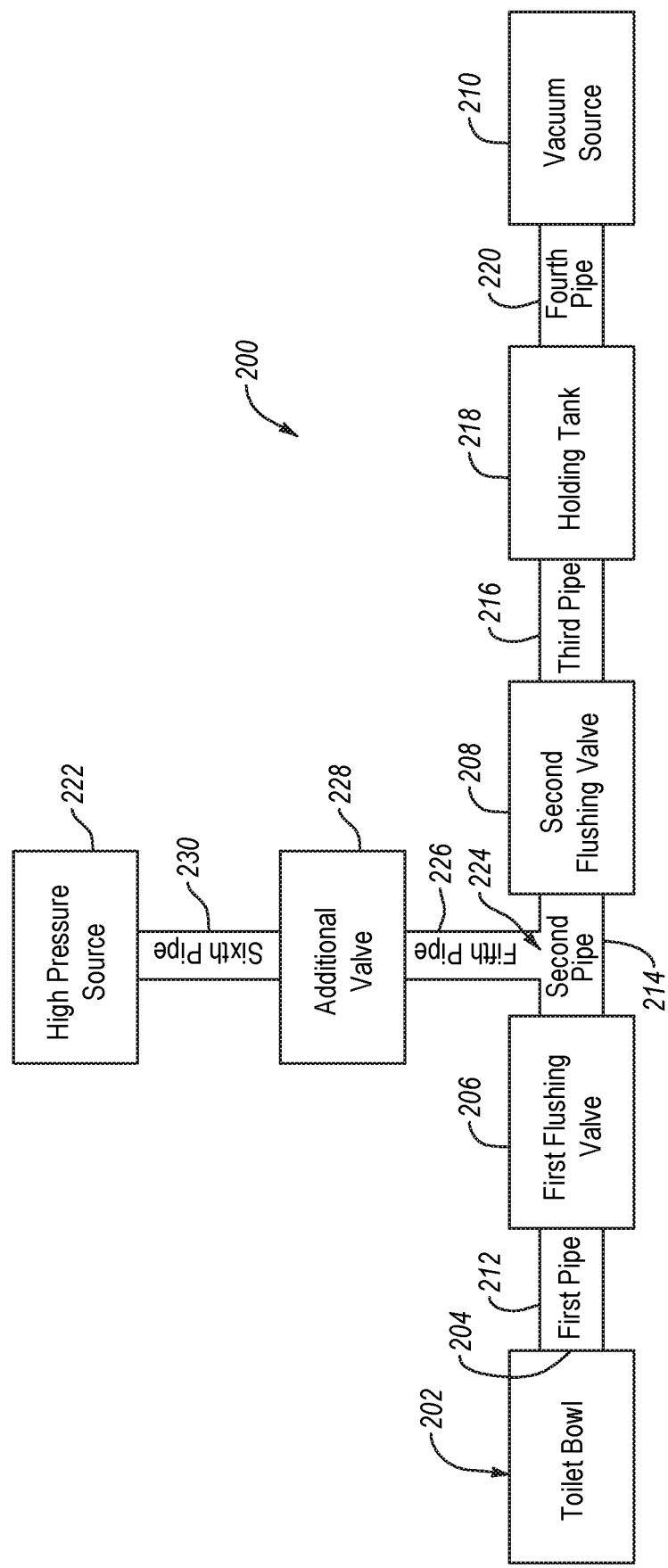
FIG. 2 is a schematic illustration of a vacuum-assisted toilet system, according to an embodiment.

FIG. 2 is a schematic illustration of a vacuum-assisted toilet system 200, according to an embodiment. Except as otherwise disclosed herein, the vacuum-assisted toilet system 200 is the same as or substantially similar to any of the vacuum-assisted toilet systems disclosed herein. For example, as illustrated, the vacuum-assisted toilet system 200 includes a toilet bowl 202 defining an outlet 204, a first flush valve 206, a second flush valve 208, a vacuum source 210, and, optionally, at least one holding tank 218. The vacuum-assisted toilet system 200 may also include a first pipe 212 that fluidly couples the outlet 204 of the toilet bowl 202 to the first flush valve 206, a second pipe 214 that fluidly couples the first flush valve 206 to the second flush valve 208, a third pipe 216 that fluidly couples the second flush valve 208 to the holding tank 218, and a fourth pipe 220 that fluidly couples the holding tank 218 to the vacuum source 210.

The vacuum-assisted toilet system 200 includes a high pressure source 222. The high pressure source 222 exhibits a pressure that is greater than the vacuum provided by the vacuum source 210. In an example, the high pressure source 222 may merely be a location that is exterior to the rest of the vacuum-assisted toilet system 200. For example, the high pressure source 222 may be the ambient atmosphere. In an example, the high pressure source 222 may include a vacuum pump or fan that is configured to flow air into the vacuum-assisted toilet system 200.

The high pressure source 222 may be used to control the pressure in one or more of the pipes of the vacuum-assisted toilet. Controlling the pressure in the one or more pipes may affect the pressure differentials across at least one of the first flush valve 206 and/or the second flush valve 208 which, in turn, may decrease the turbulent flow of waste through the respective flush valve and the associated noise.

In the illustrated embodiment, the high pressure source 222 is fluidly coupled to and configured to at least partially control the pressure in the second pipe 214. As such, the high pressure source 222 may affect the noise generated by waste flowing through at least one of the first or second flush valves 206, 208. The high pressure source 222 may be fluidly coupled to the second pipe 214 using any suitable technique.

In the illustrated embodiment, the second pipe 214 includes an inlet 224 formed therein that allows the second pipe 214 to be fluidly coupled to the high pressure source 222. The inlet 224 may be formed between the first and second flush valves 206, 208 such that the inlet 224 is positioned downstream from the first flush valve 206 and upstream from the second flush valve 208. When the high pressure source 222 is spaced from the inlet 224, the vacuum-assisted toilet system 200 may include a fifth pipe 226 extending from the second pipe 214.

In an embodiment, the vacuum-assisted toilet system 200 may include at least one additional valve 228 that is fluidly coupled to and positioned between the inlet 224 and the high pressure source 222. The additional valve 228 may be the same or substantially similar to any of the valves disclosed herein. The additional valve 228 may be configured to control the air flow from the high pressure source 222 to the second pipe 214. For example, the additional valve 228 may be in its closed state when the first and second flush valves 206, 208 switch to their respectively open states which causes the vacuum supplied by the vacuum source 210 to pull the waste from the toilet bowl 202 with more force than if the additional valve 228 was in its open state. However, the additional valve 228 may switch from its closed state to its open state before either of the first or second flush valve 206, 208 switches to their closed state. Then, while the second flush valve 208 and the additional valve 228 are in their respective open states, the first flush valve 206 may switch from the first open state to the first closed state and, due to the additional valve 228 being open, the pressure differential between the upstream and downstream side of the first flush valve 206 is less than if the additional valve 228 was in its closed state. The low pressure differential between the upstream and downstream sides of the first flush valve 206 may decrease the noise normally caused by switching the first flush valve 206 from the first open state to the first closed state while the second flush valve 208 remains in second open state. The second flush valve 208 may then be configured to switch to the second closed state after the first flush valve 206 is in the first closed state. Further, the additional valve 228 may be configured to switch to its closed state after the second flush valve 208 switches to the second closed state such that the second pipe 214 exhibits the higher pressure provided by the high pressure source 222.

The additional valve 228 may have any suitable position relative to the inlet 224 and the high pressure source 222. In an example, as shown, the additional valve 228 is spaced from the inlet 224. In such an example, as previously discussed, the vacuum-assisted toilet system 200 includes the fifth pipe 226 extending between the inlet 224 and the additional valve 228. In an example, as shown, the additional valve 228 is also spaced from the high pressure source 222. In such an example, the vacuum-assisted toilet system 200 may include a sixth pipe 230 extending between and fluidly coupling the additional valve 228 and the high pressure source 222. It is noted that the sixth pipe 230 may be omitted from the vacuum-assisted toilet system 200 when the additional valve 228 is adjacent to or integrally formed with the high pressure source 222.

Figure 3:
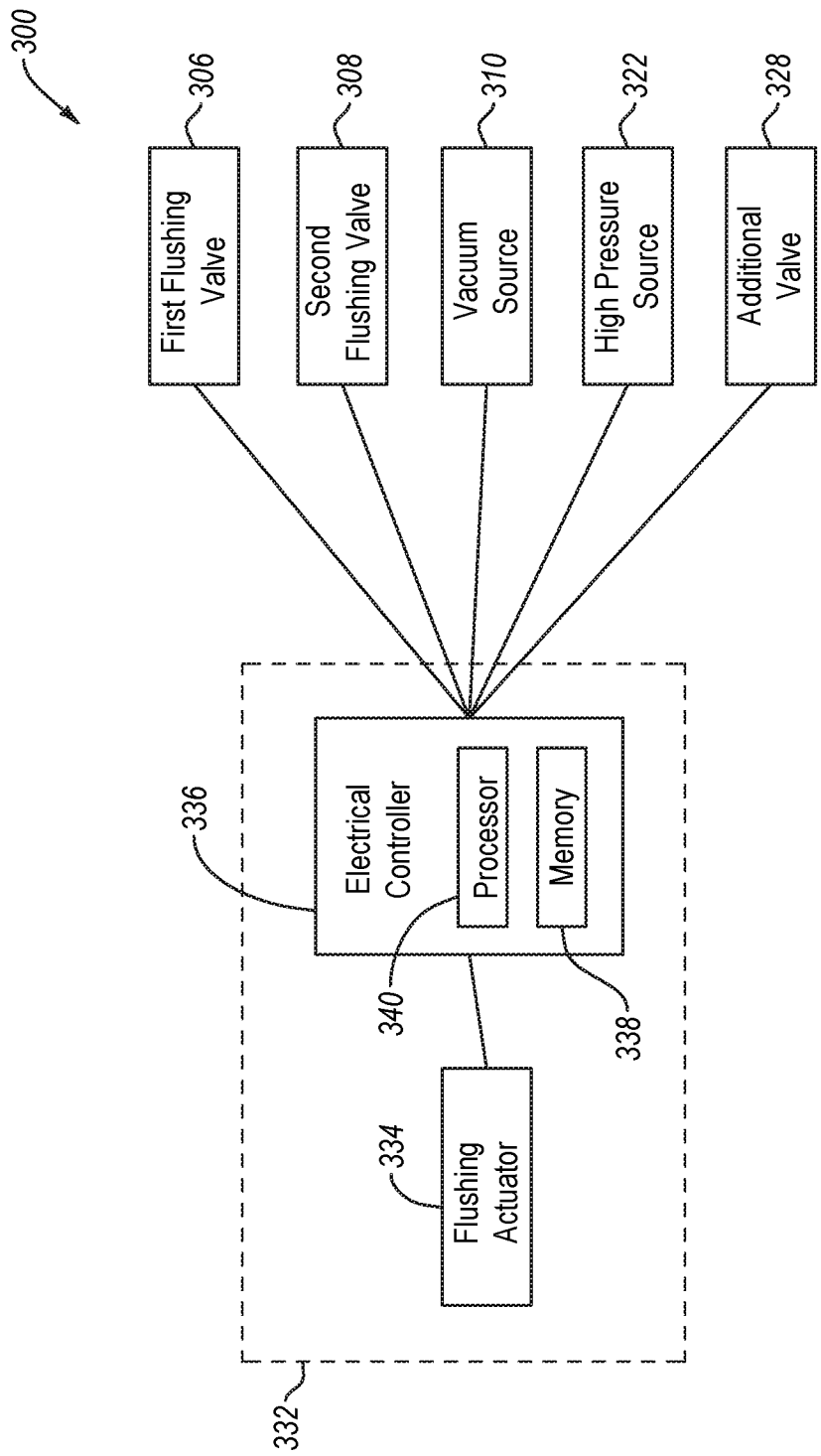
FIG. 3 is a schematic illustration of a portion of a vacuum-assisted toilet system that includes a control system configured to at least partially control the operation of one or more components of the vacuum-assisted toilet system, according to an embodiment.

FIG. 3 is a schematic illustration of a portion of a vacuum-assisted toilet system 300 that includes a control system 332 configured to at least partially control the operation of one or more components of the vacuum-assisted toilet system 300, according to an embodiment. Except as otherwise disclosed herein, the vacuum-assisted toilet system 300 is the same as or substantially similar to any of the vacuum-assisted toilet systems disclosed herein. For example, the vacuum-assisted toilet system 300 may include a toilet bowl (not shown), a first flush valve 306, a second flush valve 308, a vacuum source 310, and, optionally, a high pressure source 322 and at least one additional valve 328. It is noted that, for simplicity, only the components of the vacuum-assisted toilet system 300 that may be at least partially controlled by the control system 332 are illustrated in FIG. 3.

The control system 332 includes a flushing actuator 334. The flushing actuator 334 may include, for example, a handle or button that is configured to be manipulated by an individual. Manipulating the flushing actuator 334 may cause the vacuum-assisted toilet system 300 to flush (e.g., remove waste from a toilet bowl). For example, the flushing actuator 334 may be coupled to an electronic controller 336. The electronic controller 336 may be communicably coupled to one or more components of the vacuum-assisted toilet system 300, such as at least one of the first flush valve 306, the second flush valve 308, the vacuum source 310, the high pressure source 322, or the additional valve 328. The electronic controller 336 may be configured to at least partially control the operation of the one or more components responsive to an individual manipulating the flushing actuator 334.

The electronic controller 336 includes memory 338 (e.g., non-transitory memory) storing one or more operational instructions. The operational instructions may include instructions on how the electronic controller 336 controls the operation of the one or more components of the vacuum-assisted toilet system 300. In an embodiment when the vacuum-assisted toilet system 300 is the same as the vacuum-assisted toilet system 100 of FIG. 1, the operational instructions may include instructions to at least one of switch the first flush valve 306 from the first closed state to the first open state at a first time, switch the second flush valve 308 from the second closed state to the second open state at a second time that is after the first time, switch the second flush valve 308 from the second open state to the second closed state at a third time that is after the second time, or switch the first flush valve 306 from the first open state to the first closed state at a fourth time that is after the third time. In an embodiment when the vacuum-assisted toilet system 300 is the same as the vacuum-assisted toilet system 200 of FIG. 2, the operational instructions may include instructions to at least one of switch the first flush valve 306 from the first closed state to the first open state at a first time, switch the second flush valve 308 from the second closed state to the second open state at a second time that is after the first time, switch the additional valve 328 from a third closed state to a third open state at a third time that is after the second time, switch the first flush valve 306 from the first open state to the first closed state at a fourth time that is after the third time, switch the second flush valve 308 from the second open state to the second closed state at a fifth time that is after the fourth time, or switch the additional valve 328 from the third open state to the third closed state at a sixth time that is after the fifth time. In an embodiment, the operational instructions may include additional instructions, such as instructions that control the vacuum source 310 and/or the high pressure source 322 when the vacuum source 310 and/or the high pressure source 322 are controllably actuators (e.g., fans or vacuum pumps).

The electronic controller 336 also includes at least one processor 340 that is configured to execute the one or more operational instructions stored on the memory 338. For example, the processor 340 may execute the one or more operational instructions responsive to manipulation of the flushing actuator 334. The processor 340 may at least partially control the operation of the one or more components of the vacuum-assisted toilet system 300 responsive to executing the one or more operational instructions. For example, as previously discussed, the valves disclosed herein may include valve actuators that switch the valves between the open and closed states thereof. Responsive to executing the operational instructions, the processor 340 may direct the valve actuators to switch the valves between the open and closed states thereof at their respective times.

In an embodiment, the vacuum-assisted toilet system 300 includes a mechanical controller instead of or in conjunction with the electrical controller 336. The mechanical controller does not include memory or a processor. Instead, the mechanical controller may include one or more levers, gears, springs, etc. The mechanical controller may be operably coupled to the flushing actuator 334 such that manipulation of the flushing actuator 334 causes mechanical actuation of the mechanical controller. Mechanical actuator of the mechanical controller may cause the mechanical controller to at least partially control the operation of the vacuum-assisted toilet system 300 as disclosed herein (e.g., switch the first flush valve 306 from the first closed state to the first open state at the first time, switch the second flush valve 308 from the second closed state to the second open state at the second time that is after the first time, etc.).

Figure 4:
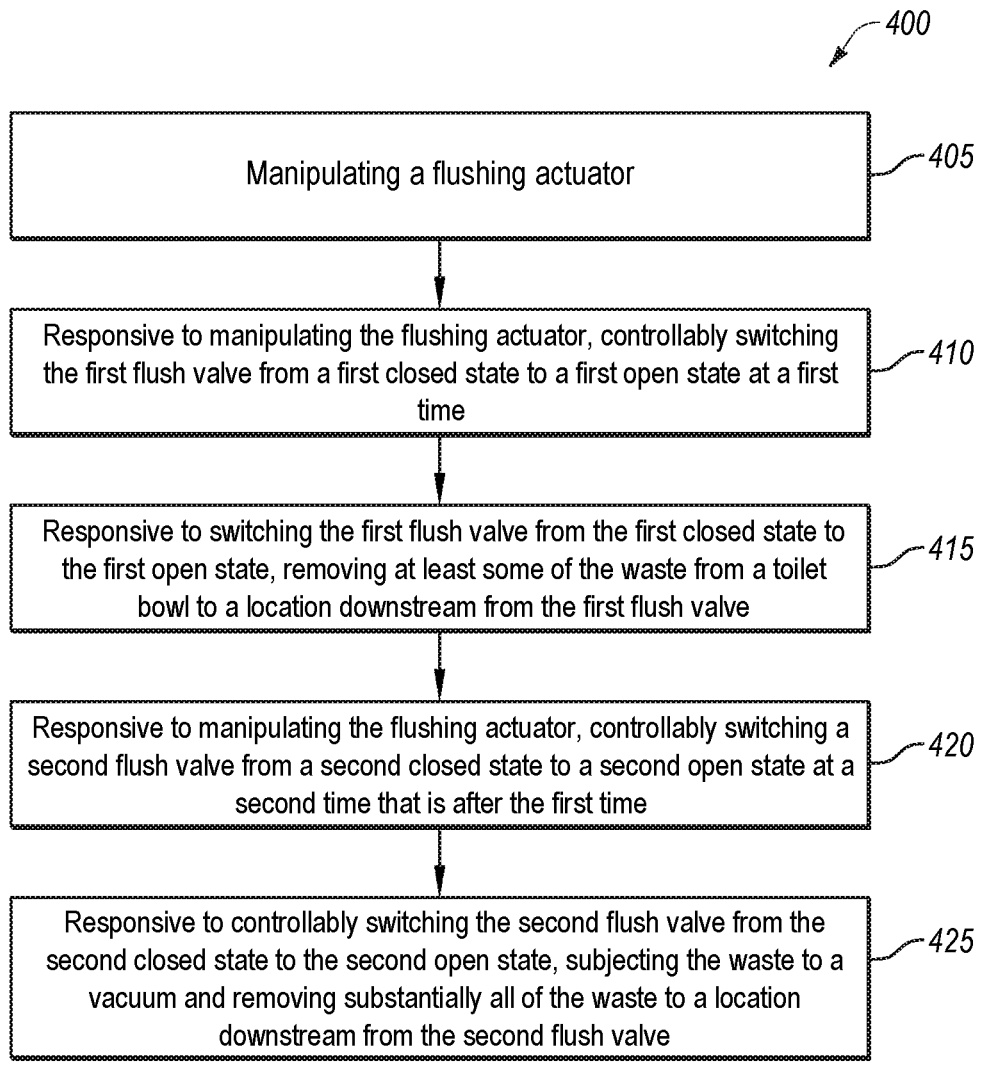
FIG. 4 is a flow chart of an example method of using any of the vacuum-assisted toilet systems disclosed herein, according to an embodiment.

FIG. 4 is a flow chart of an example method 400 of using any of the vacuum-assisted toilet systems disclosed herein, according to an embodiment. The example method 400 may include one or more actions as illustrated by one or more of acts 405, 410, 415, 420, or 425. One or more of the actions disclosed in the method 400 may be performed or caused to be performed in response to execution of one or more operational instructions by at least one processor.

The example method 400 may include act 405, which recites "manipulating a flushing actuator." The example method 400 may also include act 410, which recites, "responsive to manipulating the flushing actuator, controllably switching the first flush valve from a first closed state to a first open state at a first time." The example method 400 may also include act 415, which recites, "responsive to switching the first flush valve from the first closed state to the first open state, removing at least some of the waste from a toilet bowl to a location downstream from the first flush valve." The example method 400 may also include act 420, which recites, "responsive to manipulating the flushing actuator, controllably switching a second flush valve from a second closed state to a second open state at a second time that is after the first time." The example method 400 may also include act 425, which recites, "responsive to controllably switching the second flush valve from the second closed state to the second open state, subjecting the waste to a vacuum and removing substantially all of the waste to a location downstream from the second flush valve."

The acts illustrated in FIG. 4 are for illustrative purposes. For example, at least one of the acts may be performed in a different order, at least one of the acts may be omitted from the example method 400, at least some of the acts may be combined together, at least one of the acts may be divided into a plurality of acts, or at least one of the acts may be modified or supplemented. In an example, the method 400 may include one or more additional acts as discussed in more detail below.

Act 405 includes "manipulating a flushing actuator." In an embodiment, the flushing actuator includes a lever, button, or other suitable device that may be manipulated by an individual. In an embodiment, the flushing actuator may include a proximity or motion sensor that detects when an individual is using the vacuum-assisted toilet system and/or when the individual gets up and leaves the vacuum-assisted toilet system. In such an embodiment, manipulating the flushing actuator may include causing the proximity or motion sensor to detect that the individual is currently and/or finished using the vacuum-assisted toilet system.

Act 410 includes, "responsive to manipulating the flushing actuator, controllably switching the first flush valve from a first closed state to a first open state at a first time." For example, performing act 405 may cause a controller (e.g., an electronic and/or mechanical control) to direct the first flush valve to switch from a first closed state to a first open state at the first time. Generally, the first time is substantially simultaneous with or a short time (e.g., about 0.1 seconds to about 0.5 seconds, about 0.25 seconds to about 0.75 seconds, about 0.5 seconds to about 1 second, or about 0.75 seconds to about 2 seconds) after manipulating the flushing actuator. It is noted that the gaps between the first and second times can be selected to optimize the noise reduction.

Act 415 includes, "responsive to switching the first flush valve from the first closed state to the first open state, removing at least some of the waste from a toilet bowl to a location downstream from the first flush valve." For example, switching the first flush valve from the first closed state to the first open state allows at least some of the waste (e.g., water, urine, stool, toilet paper, etc.) to flow from the toilet bowl and through the first flush valve. However, act 415 may generate substantially less noise than a conventional vacuum-assisted toilet system because the pressure differential between the upstream and downstream sides of the first flush valve during acts 410 and 415 may be relatively small. For instance, before switching the first flush valve to the first open state, the upstream side of the first flush valve may be subject to a first pressure (e.g., room pressure or a pressure that is slightly greater than room pressure) and the downstream side of the first flush valve may be subjected to a second pressure. The second pressure is greater than the vacuum discussed in act 425 and, for example, may be similar to the first pressure. The relatively small pressure differential between the first and second pressures causes the waste to flow through the first flush valve to flow less turbulently than if the second pressure was replaced with the vacuum. Further, flowing the waste through the first flush valve causes the pressure between the upstream and downstream sides of the first flush valve to be in at least substantially equilibrium and moves any pressure differential towards the second flush valve.

Act 420 includes, "responsive to manipulating the flushing actuator, controllably switching a second flush valve from a second closed state to a second open state at a second time that is after the first time." For example, performing act 405 may cause a controller (e.g., an electronic and/or mechanical control) to direct the second flush valve to switch from the second closed state to the second open state at the second time. Generally, the second time is at least about 0.1 seconds after the first time, such as in ranges of about 0.1 seconds to about 0.5 seconds, about 0.25 seconds to about 0.75 seconds, about 0.5 seconds to about 1 second, about 0.75 seconds to about 1.5 seconds, or about 1 second to about 2 seconds. It is currently believed that such time gaps between the first and second times are sufficient to allow decrease of the noise generated during the example method 400. It is noted that the gaps between each of the times can be selected to optimize the noise reduction.

Act 425 includes, "responsive to controllably switching the second flush valve from the second closed state to the second open state, subjecting the waste to a vacuum and removing substantially all of the waste to a location downstream from the second flush valve." For example, switching the second flush valve from the second closed state to the second open state allows a vacuum to be applied from at least the outlet of the toilet bowl to the second flush valve which, in turn, pulls the waste towards and through the second flush valve. The vacuum may cause turbulent flow of the waste through the first flush valve and the second flush valve. However, the turbulent flow of the waste through the first and second flush valves may be less than conventional vacuum-assisted toilet systems for the reasons previously discussed. For example, the first flush valve is already in the first open state and at least some of the waste has already flowed through the first flush valve. As such, the noise generated by the turbulent flow of the waste through the first flush valve is less than if the first flush valve was exposed to the vacuum before switching the first flush valve to the first open state. Also, the second flush valve is further spaced from the toilet bowl than the first flush valve which partially acoustically insulates the toilet bowl from the noise generated by the turbulent air flow through the second flush valve.

In an embodiment, as previously discussed, the vacuum-assisted toilet system may be configured to be used in an airplane, a cruise ship, or another location that has a limited water supply. In such an embodiment, during act 425, the vacuum-assisted toilet system may remove at most 120 milliliters of non-human waste water (i.e., water that is not from urine or stool) from the toilet bowl. However, the amount of non-human waste water that is used to remove the waste from the toilet bowl may vary (e.g., be less than 60 milliliters or greater than 120 milliliters). In an embodiment, as previously discussed, the vacuum-assisted toilet system may be configured to be used in a residential application. In such an embodiment, during act 425, the vacuum-assisted toilet system may remove more than 120 milliliters of water from the toilet bowl since the residential vacuum-assisted toilet bowl does not have the water restrictions as, for example, the airplane or cruise ship vacuum-assisted toilet system.

As previously discussed, the example method 400 may include one or more additional acts. In an embodiment, when the vacuum-assisted toilet system is similar to the vacuum-assisted toilet system 100 of FIG. 1, the additional acts of the example method 400 may include switching the second flush valve to the second closed state at a third time that is after the second time and switching the first flush valve to the first closed state at a fourth time that is after the third time. For example, closing one of the first or second flush valves while a vacuum is applied to at least the downstream side of the flush valve may increase the turbulent flow through due to the decreased size of the flow path. The increased turbulent flow may increase the noise generated by the valve. The second flush valve may switch to the second closed state before the first flush valve switches to the first closed state because the second flush valve is further spaced from the toilet bowl than the first flush valve. As such, the noise detected at and/or near the toilet bowl caused by switching the second flush valve to the second closed state is less than if the first flush valve switched to the first closed state before the second flush valve switched to the second closed state. The first flush valve can then switch to the first closed state after the second flush valve switched to the second closed state since first flush valve is no longer exposed to the vacuum and, as such, does not generate as much noise as if the first flush valve was exposed to the vacuum. Also, switching the second flush valve to the second closed state before the first flush valve switches to the first closed state may cause the upstream and the downstream sides of the first flush valve to be at substantially the same pressures.

The third time may be at least about 0.5 seconds (e.g., about 0.5 seconds to about 1.5 seconds, about 1 second to about 2 seconds, about 1.5 seconds to about 3 seconds, about 2 seconds to about 4 seconds, or greater than 3 seconds) after the second time and the fourth time may be at least about 0.1 seconds (e.g., about 0.1 seconds to about 0.5 seconds, about 0.25 seconds to about 0.75 seconds, about 0.5 seconds to about 1 second, or about 0.75 seconds to about 1.5 seconds) after the third time. It is currently believed that such gaps between the second and third times and the third and fourth times are sufficient to reduce the noise generated by switching the first and second flush valves to their respective closed states. It is noted that the gaps between each of the times can be selected to optimize the noise reduction.

In an embodiment, when the vacuum-assisted toilet system is similar to the vacuum-assisted toilet system 200 of FIG. 2, the additional acts of the example method 400 may include, after the second time, switching an additional valve to a third open state at a third time that is after the first time (e.g., after the second time). Opening the additional valve provides a second source of air to flow towards the vacuum source. After switching the additional valve to the third open state, the first flush valve may switch to the first closed state at a fourth time that is after the second and third times. The first flush valve may switch to the first closed state at the third time since the third open state of the additional valve decreases the amount of waste (e.g., air) flowing through the first flush valve and, as such, decreases the amount of noise generated by switching the first flush valve to the first closed state. After switching the first flush valve to the first closed state, the second flush valve may switch to the second closed state at a fifth time that is after the fourth time. It is noted that a downstream side of the first flush valve is exposed to a pressure that is greater than the vacuum because the additional valve is still in the third open state when the second flush valve switched to the second closed state. Finally, example method 400 include switching the additional valve to the third closed state at a sixth time that is after the fifth time.

The third time may be after at least one of the first or second time, the fourth time may be after the third time, and the fifth time may be after the sixth time by at least about 0.1 seconds, such as in ranges of about 0.1 seconds to about 0.5 seconds, about 0.25 seconds to about 0.75 seconds, about 0.5 seconds to about 1.5 seconds, about 1 second to about 2 seconds, about 1.5 seconds to about 3 seconds, about 2 seconds to about 4 seconds, or greater than 3 seconds. It is currently believed that such gaps between the different times are sufficient to reduce the noise generated by switching the first and second flush valves to their respective closed states.

It is noted that the gaps between each of the times can be selected to optimize the noise reduction.

In an embodiment, to conserve energy, the additional acts of the example method 400 may include controllably activating (e.g., turning on) and deactivating (e.g., turning off) at least one of the vacuum source or the high pressure source when the vacuum source or the high pressure source includes a vacuum pump, fan, etc.

The following comparative and working examples provide further detail in connection with the specific vacuum-assisted toilet systems disclosed herein.

Comparative Example

The vacuum-assisted toilet system of the comparative example included a toilet bowl, a flush valve fluidly coupled to the toilet bowl via a first pipe, a holding tank fluidly coupled to the flush valve via a second pipe, and a vacuum pump fluidly coupled to the holding tank via a third pipe such that an interior space of the holding tank is exposed to a vacuum. The first pipe exhibiting a length of about 15 cm and the second pipe exhibiting a length of about 5 m. A microphone was disposed in or near the toilet bowl to detect the noise generated during use of the vacuum-assisted toilet system.

Figure 5:
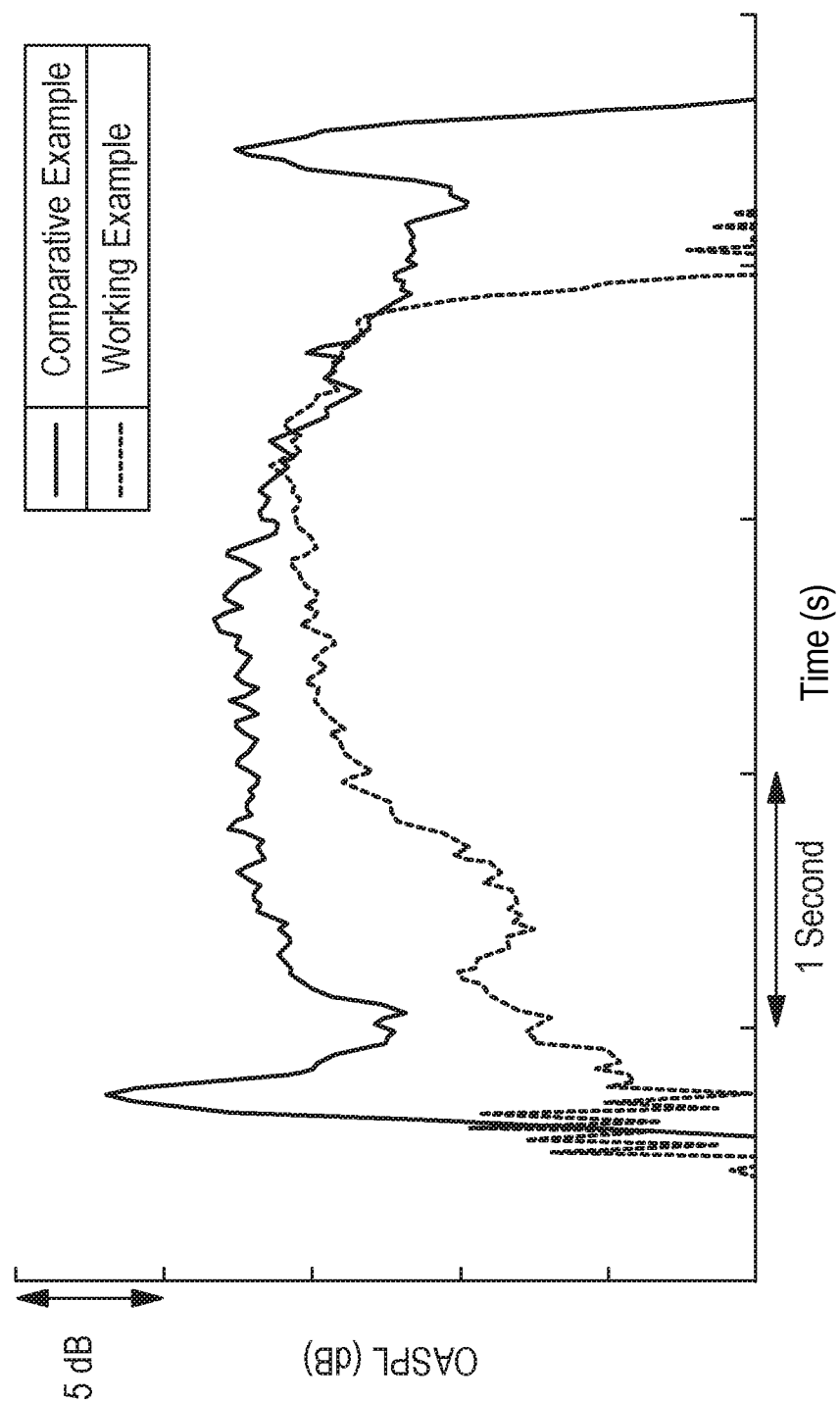
FIG. 5 is a graph illustrating noise (in decibels) detected over a period of time after flushing (e.g., manipulating a flushing actuator) the vacuum-assisted toilet system of the comparative example and the working example.

FIG. 5 is a graph illustrating noise (in decibels) detected over a period of time after flushing (e.g., manipulating a flushing actuator) the vacuum-assisted toilet system of the comparative example. As shown in FIG. 5, switching the flush valve between the open and closed states thereof results in a large and sudden spike in noise generated by the vacuum-assisted toilet system of the comparative example. For example, FIG. 5 shows a first large and sudden spike in noise at about 0.5 seconds caused by switching the flush valve from the closed state to the open state and a second large and sudden spike in noise at about 4.25 seconds cause by switching the flush valve from the open state to the closed state. These large and sudden spikes in noise are caused by the pressure differential between the flush valve when switching the flush valve between the open and closed states thereof.

Working Example

The vacuum-assisted toilet system of the comparative example was modified to include an additional flush valve ("second flush valve") between the original flush valve ("first flush valve") and the holding tank to form the vacuum-assisted toilet system of the working example. The vacuum-assisted toilet system of the working example included a first pipe having a length of about 15 cm that fluidly coupled the toilet bowl to the first flush valve, a second pipe having a length of about 5 m that fluidly coupled the first flush valve to the second flush valve, and a third pipe having a length of about 25 to about 30 cm that fluidly coupled the second flush valve to the holding tank. During operation, the first flush valve was switched to the first open state before the second flush valve was switched to the second open state. Further, the second flush valve was switched to the second closed state before switching the first flush valve to the first closed state.

FIG. 5 also illustrates the noise detected over a period of time after flushing the vacuum-assisted toilet system of the working example. As shown by comparing the detected noise of the comparative example versus the working example, operating the vacuum-assisted toilet system of the working example reduced the large and sudden spikes in noise associated with switching the first flush valve (i.e., the flush valve of the comparative example) between the closed and open states thereof.

While various aspects and embodiments have been disclosed herein, other aspects and embodiments are contemplated. The various aspects and embodiment disclosed herein are for purposes of illustration and are not intended to be limiting.

What is claimed:

1. A vacuum-assisted toilet system, comprising:
a toilet bowl including an outlet;
a first flush valve fluidly coupled to the outlet of the toilet bowl, the first flush valve configured to controllably switch between a first open state and a first closed state;
a second flush valve fluidly coupled to the first flush valve at a location downstream from the first flush valve, the second flush valve configured to controllably switch between a second open state and a second closed state; and
a vacuum source fluidly coupled to the second flush valve at a location downstream from the second flush valve;
wherein:
the first flush valve is configured to controllably switch from the first closed state to the first open state at a first time;
the second flush valve is configured to controllably switch from the second closed state to the second open state at a second time that is after the first time; and
the first flush valve is configured to controllably switch from the first open state to the first closed state at a third time that is after the second time.

2. The vacuum-assisted toilet system of claim 1, further comprising a pipe extending between and fluidly coupling the outlet of the toilet bowl and the first flush valve.

3. The vacuum-assisted toilet system of claim 1, further comprising a pipe extending between and fluidly coupling the first flush valve to the second flush valve.

4. The vacuum-assisted toilet system of claim 3:
wherein the pipe includes an inlet between the first flush valve and the second flush valve; and
further comprising at least one additional pipe extending from the inlet to a high pressure source; and
wherein the second flush valve is configured to controllably switch from the second open state to the second closed state at a fourth time that is after the third time.

5. The vacuum-assisted toilet system of claim 1, wherein:
the second flush valve is configured to switch from the second open state to the second closed state at a fourth time that is after the second time and before the third time.

6. The vacuum-assisted toilet system of claim 1, wherein the vacuum source includes at least one holding tank, the at least one holding tank configured to receive waste from the toilet bowl.

7. The vacuum-assisted toilet system of claim 6:
wherein the at least one holding tank is on an airplane; and
further comprising a pipe extending from the at least one holding tank to an exterior of the airplane.

8. The vacuum-assisted toilet system of claim 6, wherein the vacuum source includes at least one vacuum pump fluidly coupled to the at least one holding tank.

9. The vacuum-assisted toilet system of claim 6, further comprising a pipe extending between and fluidly coupling the second flush valve to the at least one holding tank.

10. The vacuum-assisted toilet system of claim 1, further comprising an electrical controller operably coupled to the first flush valve, the second flush valve, and a flushing actuator, the electrical controller configured to at least partially control one or more operations of the first flush valve and the second flush valve, the controller including:
non-transitory memory storing one or more operational instructions therein; and
at least one processor configured to:
responsive to manipulating the flushing actuator, execute the one or more operational instructions; and
responsive to executing the one or more operational instructions, direct the first flush valve to controllably switch between from the first closed state to the first open state at the first time and direct the second flush valve to controllably switch from the second closed state to the second open state at the second time.

11. The vacuum-assisted toilet system of claim 10, wherein the at least one processor is configured to, responsive to executing the one or more operational instructions, direct the second flush valve to controllably switch from the second open state to the second closed state at a fourth time that is after the second time and direct the first flush valve to controllably switch from the first open state to the first closed state at the third time that is after the fourth time.

12. The vacuum-assisted toilet system of claim 1, wherein the second flush valve is configured to be fluidly coupled to a sewer or septic tank.

13. A method of operating a vacuum-assisted toilet system, the method comprising:
manipulating a flushing actuator;
responsive to manipulating the flushing actuator, controllably switching a first flush valve from a first closed state to a first open state at a first time, the first flush valve fluidly coupled to an outlet of a toilet bowl;
responsive to controllably switching the first flush valve from the first closed state to the first open state, removing at least some waste from the toilet bowl to a location downstream from the first flush valve;
responsive to manipulating the flushing actuator, controllably switching a second flush valve from a second closed state to a second open state at a second time that is after the first time, the second flush valve coupled to and located downstream from the first flush valve;
responsive to controllably switching the second flush valve from the second closed state to the second open state, subjecting the waste from the toilet bowl to a vacuum from a vacuum source and removing substantially all of the waste to a location downstream from the second flush valve; and
controllably switching the first flush valve from the first open state to the first closed state at a third time that is after the second time.

14. The method of claim 13, further comprising responsive to manipulating the flushing actuator, executing one or more operational instructions stored on non-transitory memory with at least one processor that causes the at least one processor to direct:
the first flush valve to controllably switch from the first closed state to the first open state at the first time; and
the second flush valve to controllably switch from the second closed state to the second open state at the second time.

15. The method of claim 13, wherein the second time is about 0.1 seconds to 1.0 second after the first time.

16. The method of claim 13, further comprising:
controllably switching the second flush valve from the second open state to the second closed state at a fourth time that is after the third time.

17. The method of claim 13, further comprising:
controllably switching the second flush valve from the second open state to the second closed state at a fourth time that is after the second time and before the third time.

18. The method of claim 13, wherein removing substantially all of the material to a location downstream from the second flush valve includes removing at most 120 milliliters of non-human waste water from the toilet bowl.

19. A vacuum-assisted toilet system, comprising:
a toilet bowl including an outlet;
a first flush valve configured to controllably switch between a first open state and a first closed state;
a first pipe extending between and fluidly coupling the outlet of the toilet bowl to the first flush valve;
a second flush valve configured to controllably switch between a second open state and a second closed state;
a second pipe extending between and fluidly coupling the first flush valve to the second flush valve;
at least one holding tank configured to receive waste from the toilet bowl; and
a third pipe extending between and fluidly coupling the second flush valve to the at least one holding tank; and
a vacuum source fluidly coupled to the second flush valve at a location downstream from the second flush valve;
wherein:
the first flush valve is configured to controllably switch from the first closed state to the first open state at a first time;
the second flush valve is configured to controllably switch from the second closed state to the second open state at a second time that is after the first time; and
the first flush valve is configured to controllably switch from the first open state to the first closed state at a third time that is after the second time.

20. The vacuum-assisted toilet system of claim 19, further comprising an electrical controller operably coupled to the first flush valve, the second flush valve, and a flushing actuator, the electrical controller configured to at least partially control one or more operations of the first flush valve and the second flush valve, the controller including:
non-transitory memory storing one or more operational instructions therein; and
at least one processor configured to:
responsive to manipulating the flushing actuator, execute the one or more operational instructions; and
responsive to executing the one or more operational instructions, direct the first flush valve to controllably switch from the first closed state to the first open state at the first time and direct the second flush valve to controllably switch from the second closed state to the second open state at the second time.

* * * * *